United States Patent Office 2,811,478
Patented Oct. 29, 1957

2,811,478

METHODS FOR REPELLING RODENTS WITH AN ALKYL 2-FUROATE TETRACHLORIDE

Manlio A. Manzelli, Bon Air, and Virgil H. Young, Jr., and Charles L. Harowitz, Richmond, Va., assignors to Virginia-Carolina Chemical Corporation, Richmond, Va., a corporation of Virginia No Drawing. Application July 15, 1954,
Serial No. 443,704

6 Claims. (Cl. 167—46)

This application is a continuation-in-part of our co-pending application, Serial No. 418,224, filed March 23, 1954, for Insect and Rodent Repellent.

The invention relates to the use of alkyl 2-furoate tetrachlorides, and compositions which contain these compounds, as insect, bird and rodent repellents.

There is great need for effective and inexpensive insect, bird and rodent repellents which are at least not dangerously poisonous, are odorless or have inoffensive odors, are colorless or have inoffensive colors, are relatively non-corrosive and in other respects are adapted for use for application to food containers, seed and other materials and objects subject to damage by insects and/or birds and/or rodents. The annual loss of packaged food products in the United States by insect and rodent damage has been estimated at several billion dollars. The loss due to rodents alone is estimated at two billion dollars. The loss to foraging birds of expensive hybrid seeds after planting plus the high cost of labor of replanting is becoming of increasing importance to the farmer. An object of the present invention, therefore, is to provide means for preventing at least a substantial part of these losses.

Repellents are not to be confused with poisons, i. e. insecticides and rodenticides. Insect and rodent poisons when applied to food packages which are susceptible to attack such as those having cellulosic containers are ineffective to the extent that the insect or rodent may damage or destroy one or more packages before the poison takes effect. Thus the poison would be effective only for preventing the insect or rodent from continuing to damage other packages. A repellent on the other hand, if it is effective, serves to prevent the insect or rodent from attacking the initial package and thus all packages are saved. A further object of our invention, therefore, is to provide an insect and rodent repellent which can be incorporated in the package material or applied to its surface as or in a surface coating and will prevent insects and rodents from attacking the package.

Generally insect repellents are not effective rodent and bird repellents, and rodent and bird repellents are not effective insect repellents. It is necessary generally to employ several materials to provide protection against insects, birds and rodents. An object of our invention, therefore, is to provide a class of materials any one of which is effective as an insect repellent, a bird repellent and a rodent repellent.

A further object of our invention is to provide insect, rodent and bird repellents which are distinguished from most, if not all, prior repellents in that they have none or only negligible insecticidal, rodenticidal and avicidal properties and which are of low toxicity to man and domestic animals.

A further object of our invention is to provide insect, bird and rodent repellents, which as compared with some prior art repellents, are relatively inexpensive and are, therefore, economically applicable for the protection of low-cost materials and products.

The repellents of the present invention have a relatively high rodent repellent activity and are obtainable by a relatively inexpensive process from relatively low-cost and at present increasingly plentiful starting materials; 2-furoic acid and its esters, the 2-furoates (see Chem. and Eng. News 32, 798 (1954)).

The process for the production of the products consists essentially in simple chlorination of the alkyl 2-furoates. The alkyl 2-furoates can be obtained on the commercial market or they may be simply and easily prepared from 2-furoic acid by any known esterification method, one general procedure for which is illustrated below.

Chlorination of ethyl 2-furoate was reported by Hill and Jackson. The chlorination was disclosed as proceeding at low temperature and as yielding a stable addition product, ethyl 2-furoate tetrachloride.

We have found that when ethyl 2-furoate is chlorinated at from 0° to 7° C. to the evolution of hydrochloric acid as described hereinafter, the reaction proceeds smoothly to the formation of ethyl 2-furoate tetrachloride of about 75% purity. We have found that this product is more stable than as indicated by the above mentioned authors Hill and Jackson. We have found it to be capable of normal distillation under reduced pressure, and to be capable of normal handling and storage.

The crude product contains not only the ethyl 2-furoate tetrachloride but also ethyl 5-chlorofuroate and ethyl 3,4-dichlorofuroate and ethyl 4,5-dichlorofuroate formed by evolution of hydrogen chloride from the ethyl 2-furoate tetrachloride. The amounts of these mono and dichlorofuroates present are variable and their exact proportions are not known. It is known, however, that under the conditions described hereinafter for the preparation of the product, which conditions are reproducible, products are obtained which regularly contain about 75% of the ethyl 2-furoate tetrachloride and about the same proportion of the mono and dichloro byproducts. The physical properties and the repellent activity of the products are uniform.

Purification of the crude product with respect to the ethyl 2-furoate tetrachloride is unnecessary and does not materially improve the repellant properties of the product. The repellency index, as will be shown below, for the technical product is 98.7 whereas the repellency index of the purified, distilled product is 99.0. This difference of 0.3% is well within the experimental limits of the tests and is insignificant.

The repellent property of ethyl 2-furoate tetrachloride with respect to insects is shown by the following tests.

A number of brown paper bags were soaked with the following materials:

(1) A 2.5% solution of ethyl 2-furoate tetrachloride in absolute ethanol;
(2) A 2.5% solution of dichloro-diphenyl-trichloroethane in carbon tetrachloride;
(3) Absolute ethanol;
(4) Carbon tetrachloride.

After drying each bag was filled approximately one-fourth full of wheat flour and sealed. Each bag of group 1 was placed in a metal tray together with a bag of group 3 and each bag of group 2 was placed in a metal tray together with a bag of group 4. Fifty adult confused flour beetles (*Tribolium confusum*) were placed in each metal tray and regular observations were made of the beetle action.

Five days after the beetles were released there was no evidence of any attempt by the beetles to gain entry into the group 1 bags but the bags of groups 2, 3, and 4 had all been entered by the beetles. After 12 days the beetles still had not approached the group 1 bags. The group 1 bags were then moved to new metal trays and fifty new adult confused beetles were released in each tray. At the end of seven weeks there was no evidence that the beetles had attacked the bags.

The repellent property of ethyl 2-furoate tetrachloride with respect to rodents is shown by the following tests:

The test compounds were mixed with a starch paste and the mixture applied as a coating at the rate of 50 mg. of the test compound per square inch of cardboard cartons containing rat food and the cartons were then exposed to colonies of wild Norway rats for two test periods. The results are given in the following table.

| Compound | Days until penetrated | | | Percent, Avg. |
| --- | --- | --- | --- | --- |
| | Min. | Max. | Avg. | |
| EFTC | 10 | 36 | 27.3 | |
| | 36 | 36 | 36.0 | 87.2 |
| TNB-A | 20 | 27 | 24.3 | |
| | 21 | 33 | 29.0 | 79.4 |
| ZAC | 17 | 29 | 21.7 | |
| | 8 | 12 | 10.0 | 54.9 |
| Untreated Control | 2 | 4 | 3.0 | |
| | 2 | 3 | 2.7 | 5.2 |

EFTC=ethyl 2-furoate tetrachloride.
TNB-A=trinitrobenzene-aniline complex, comparison standard.
ZAC=zinc dimethyl dithiocarbamate-cyclohexylamine, comparison standard.

At the end of the 36-day test period 50% of the boxes treated with ethyl 2-furoate tetrachloride were undamaged.

The repellent properties of the alkyl 2-furoate tetrachlorides with respect to food acceptance tests with rodents are illustrated in the following results. Individual rats were given two feed cups, one containing 20 g. of untreated food, the other containing 20 g. of food treated with the alkyl 2-furoate tetrachloride. The repellency index (K) was determined from the daily food consumption by the formula:

$$K = 100 - \frac{1}{100}W(8T_1 + 4T_2 + 2T_3 + T_4)(U_1 + U_2 + 2U_3 + 4U_4 + 8X)$$

where $T_1 \ldots T_4$ represent the daily consumption of treated food in grams; $U_1 \ldots U_4$ represent the daily consumption of untreated food; X is the amount of untreated food remaining at the end of the test; and W is the body weight of the animal in kg. The alkyl 2-furoate tetrachloride was applied in each instance in the form of a solution in absolute ethanol followed by air drying for 24 hours.

*Daily food consumption (in grams)*
[Feed treated with alkyl 2-furoate tetrachlorides alkyl groups and percent of treatment shown.]

| Sample | 24 hr. | 48 hr. | 72 hr. | 96 hr. | mg./kg. eaten | K |
| --- | --- | --- | --- | --- | --- | --- |
| 0.5% Methyl | 0.0 | 0.0 | 1.7 | 1.7 | 45 | 99.0 |
| 1% Methyl | 0.0 | 0.0 | 0.0 | 0.0 | 0 | 100.0 |
| 2% Methyl | 0.0 | 0.0 | 0.5 | 0.5 | 60 | 99.0 |
| Untreated | 13.3 | 20.0 | | | | |
| 0.5% Ethyl * | 0.0 | 0.0 | 1.3 | 2.0 | 60 | 99.0 |
| 1% Ethyl * | 0.0 | 0.0 | 0.0 | 0.7 | 30 | 99.0 |
| 2% Ethyl * | 0.0 | 0.0 | 0.3 | 0.7 | 70 | 99.0 |
| Untreated * | 18.0 | 20.0 | | | | |
| 2% Ethyl | 0.0 | 0.0 | 0.0 | 0.3 | 33 | 98.7 |
| Untreated | 18.0 | 20.0 | | | | |
| 0.5% Propyl | 0.0 | 0.3 | 2.3 | 5.3 | 155 | 96.0 |
| 1% Propyl | 0.0 | 0.0 | 0.0 | 0.0 | 0 | 100.0 |
| 2% Propyl | 0.0 | 0.0 | 1.0 | 2.7 | 275 | 96.0 |
| Untreated | 14.3 | 20.0 | | | | |
| 2% Butyl | 0.0 | 0.0 | 0.0 | 0.0 | 0 | 100.0 |
| Untreated | 18.0 | 20.0 | | | | |

* Pure distilled product.

With the exception of the ethyl sample specifically marked with an asterisk in the above table, all samples tested in the food acceptance test were technical grade, undistilled products.

The repellent property of ethyl 2-furoate tetrachloride with respect to birds is shown by the following tests:

A 5 g. sample of technical grade ethyl 2-furoate tetrachloride was dissolved in 95 g. of absolute ethanol. Forty grams of standard parakeet seed (millet and flax seed) was immersed in the alcohol solution for 10 minutes. The alcohol solution was poured off and the seeds were air dried for 24 hours.

Two feeding containers, one with 30 g. of treated seed and one with 30 g. of untreated seed, were placed in a cage with two parakeets and the containers were weighed after periods of 24 and 48 hours with the following results:

*Seed consumption (in grams)*

| Sample | 24 hr. | 48 hr. |
| --- | --- | --- |
| 5% Ethyl | 0 | 0 |
| Untreated | 10.0 | 19.2 |

Prior to these tests, it had been found that parakeet seed treated with absolute ethanol had no repellent properties and no physiological effect on the birds.

As an illustrative example of a standard method for the esterification of 2-furoic acid the following preparation is given for ethyl 2-furoate. In the following examples all parts are by weight.

*Preparation of ethyl 2-furoate*

A mixture of 560 parts of 2-furoic acid 783 parts of absolute ethanol, 10 parts of toluenesulfonic acid, 660 parts of benzene and 18 parts of concentrated sulfuric acid was placed in a reaction vessel fitted with a packed column, a thermometer and a water-collecting apparatus. The mixture was refluxed for a total of 39 hours and a total of 243 parts of water was collected. The benzene and excess alcohol were removed, first at atmospheric pressure and then under reduced pressure.

The crude product was poured into 2000 parts of cold water. The resulting water mixture was extracted with 1416 parts of ethyl ether. The ether solution was washed successively with 5% sodium hydroxide, water and saturated sodium chloride solution. The ether was evaporated at atmospheric pressure and the residue was distilled. A yield of 636 parts (91%) of ethyl 2-furoate was obtained; B. P. 123° C./77 mm.

*Chlorination of ethyl 2-furoate*

A solution of 404 parts of ethyl 2-furoate in 956 parts of carbon tetrachloride was placed in a reaction vessel fitted with a gas-inlet tube, stirrer, thermometer and reflux condenser. A gas outlet from the condenser was led through a standard cold vapor trap and into a solution of 40 parts of pyridine in 216 parts of ethyl ether. Dry chlorine was bubbled into the reaction solution and the reaction temperature was maintained at 0-7° C. After 3 hours and 25 minutes, a white precipitate of pyridine hydrochloride began to form in the train-end ether solution which indicated that the chlorination was complete and HCl evolution from a replacement type reaction had begun. The chlorine supply was cut off.

The reaction product (1727 parts) was washed with 800 parts of water, followed by successive washes with 840, 420, 525 and 840 part portions of 5% sodium carbonate and a final wash with 800 parts of water. The washed material had a neutral pH.

The carbon tetrachloride was removed under reduced pressure (water pump) at a bath temperature of 60° C. The remaining solution (698 parts) was stripped at a pot temperature of 72° C./0.4 mm. The resultant technical-grade ethyl 2-furoate tetrachloride (645.5 parts; 79.3% yield) was a very light yellow, viscous liquid; $n_D^{25}$ 1.4970; $d_4^{20}$ 1.499.

A sample of the technical grade product was distilled under reduced pressure and pure ethyl 2-furoate tetrachloride was obtained; B. P. 83-5° C./0.07 mm; $n_D^{25}$ 1.4934. Analysis: Calcd. for $C_7H_8Cl_4O_3$; C, 29.75; H, 2.84; Cl, 50.25; Found: C, 29.76; H, 2.73; Cl, 50.37.

Chlorination of methyl 2-furoate

A mixture of 63 parts of methyl 2-furoate and 196 parts of carbon tetrachloride was chlorinated, at —5 to 0° C., in the same manner as described for ethyl 2-furoate. After 78 parts of chlorine had been added pyridine hydrochloride began to precipitate in the final bottle of the gas train and the chlorination was stopped.

The reaction mixture was washed and worked up similarly to the chlorination product of ethyl 2-furoate. The carbon tetrachloride was stripped to a pot temperature of 92° C./1.0 mm. A yield of 114 parts of the light yellow, technical chlorinated product was obtained (85% of theoretical).

A 40 part sample of the technical product was distilled under reduced pressure and a yield of 20 parts of methyl 2-furoate tetrachloride was obtained; B. P. 91–3° C./0.4 mm; $n_D^{23}$ 1.5035; $d_4^{20}$ 1.573.

Chlorination of propyl 2-furoate

A mixture of 77 parts of propyl 2-furoate and 197 parts of carbon tetrachloride was chlorinated, at —5 to 0° C., in the same manner as described for the methyl and ethyl homologs. After 59 parts of chlorine had been added pyridine hydrochloride began to precipitate in the last bottle of the gas train and the chlorination was stopped.

The reaction mixture was washed as previously described and stripped to a pot temperature of 102° C./2 mm. The yield of light yellow, technical propyl 2-furoate tetrachloride was 117 parts (79.3% of theoretical); $n_D^{25}$ 1.4915; $d_4^{20}$ 1.387.

The technical product could not be distilled under reduced pressure without excessive decomposition.

Chlorination of butyl 2-furoate

A mixture of 84 parts of butyl 2-furoate and 198 parts of carbon tetrachloride was chlorinated at —5 to 0° C. Pyridine hydrochloride began to precipitate after 79 parts of chlorine had been added and the chlorination was stopped.

The chlorination product was washed and stripped to a pot temperature of 105° C./1.0 mm. The yield of light yellow, technical butyl 2-furoate tetrachloride was 128 parts or 82.3% of theoretical.

A sample (44 parts) of the technical product was distilled under reduced pressure and 23 parts of butyl 2-furoate tetrachloride was obtained; B. P. 99–101° C./0.3 mm; $n_D^{24}$ 1.4858; $d_4^{20}$ 1.345.

The above examples are merely illustrative of our invention. Other alkyl 2-furoates which may be chlorinated to yield products which have repellent properties are: isopropyl 2-furoate, isobutyl 2-furoate, sec-butyl 2-furoate, tert-butyl 2-furoate, amyl 2-furoate, isoamyl 2-furoate, hexyl 2-furoate, isohexyl 2-furoate, heptyl 2-furoate, isoheptyl 2-furoate, octyl 2-furoate, isooctyl 2-furoate, nonyl 2-furoate, decyl 2-furoate, hendecyl 2-furoate, dodecyl 2-furoate, hexadecyl 2-furoate, octadecyl 2-furoate and even higher alkyl esters of 2-furoic acid.

As stated above the technical grade products, which contain about 75% of alkyl 2-furoate tetrachloride and about 25% of a mixture of alkyl 5-chloro-2-furoate, alkyl 3,4-dichloro-2-furoate and alkyl 4,5-dichloro-2-furoate, is relatively inexpensive compared with known repellents of comparable activity. The use of said products and more or less purified derivatives thereof which contain a larger proportion of alkyl 2-furoate tetrachloride and a smaller proportion of said by-products up to and including the pure alkyl 2-furoate tetrachloride and mixtures thereof with carriers, vehicles, and solvents such as those described and with other inert or active materials serving as diluents, spreaders, coloring agents, odor contributing agents, supplemental repellent agents and insecticidal agents is embraced by our invention.

We claim:
1. Process of protecting materials which are susceptible to attack by rodents which comprises associating therewith an alkyl 2-furoate tetrachloride in which the alkyl group contains from 1 to 18 carbon atoms.
2. Process as defined in claim 1 in which the alkyl group is methyl.
3. Process as defined in claim 1 in which the alkyl group is ethyl.
4. Process as defined in claim 1 in which the alkyl group is propyl.
5. Process as defined in claim 1 in which the alkyl group is butyl.
6. Process as defined in claim 1 in which the alkyl group is octyl.

References Cited in the file of this patent

UNITED STATES PATENTS

| | | |
|---|---|---|
| 1,871,949 | Bottrell | Aug. 16, 1932 |
| 1,942,892 | Adams | Jan. 9, 1934 |

OTHER REFERENCES

OSRD Committee Report No. 16, published August 1, 1947, p. 100.